US011091171B2

(12) United States Patent
Gordon et al.

(10) Patent No.: US 11,091,171 B2
(45) Date of Patent: Aug. 17, 2021

(54) CONTROLLING DRIVING MODES OF SELF-DRIVING VEHICLES

(71) Applicant: Slingshot IOT LLC, Baltimore, MD (US)

(72) Inventors: Michael S. Gordon, Yorktown Heights, NY (US); James R. Kozloski, New Fairfield, CT (US); Ashish Kundu, New York, NY (US); Peter K. Malkin, Ardsley, NY (US); Clifford A. Pickover, Yorktown Heights, NY (US)

(73) Assignee: Slingshot IOT LLC, Baltimore, MD (US)

( * ) Notice: Subject to any disclaimer, the term of this patent is extended or adjusted under 35 U.S.C. 154(b) by 0 days.

(21) Appl. No.: 16/997,202

(22) Filed: Aug. 19, 2020

(65) Prior Publication Data

US 2021/0163034 A1    Jun. 3, 2021

Related U.S. Application Data

(63) Continuation of application No. 16/899,407, filed on Jun. 11, 2020, now abandoned, which is a
(Continued)

(51) Int. Cl.
*B60W 50/12* (2012.01)
*G05D 1/00* (2006.01)
(Continued)

(52) U.S. Cl.
CPC ............ *B60W 50/12* (2013.01); *B60W 40/06* (2013.01); *B60W 40/08* (2013.01); *B60W 40/10* (2013.01);
(Continued)

(58) Field of Classification Search
None
See application file for complete search history.

(56) References Cited

U.S. PATENT DOCUMENTS

| 4,665,395 A | 5/1987 | Van Ness |
| 4,908,988 A | 3/1990 | Yamamura et al. |
| (Continued) | | |

FOREIGN PATENT DOCUMENTS

| CA | 2392578 A1 | 5/2001 |
| CA | 2392652 A1 | 5/2001 |
| (Continued) | | |

OTHER PUBLICATIONS

Tesla Model "S" Manual and Overview, 2015.
(Continued)

*Primary Examiner* — Todd Melton
(74) *Attorney, Agent, or Firm* — Kinney & Lange, P.A.

(57) ABSTRACT

A computer-implemented method, system, and/or computer program product controls a driving mode of a self-driving vehicle (SDV). One or more processors compare a control processor competence level of an on-board SDV control processor in controlling the SDV to a human driver competence level of a human driver in controlling the SDV while the SDV encounters a current roadway condition which is a result of current weather conditions of the roadway on which the SDV is currently traveling. One or more processors then selectively assign control of the SDV to the SDV control processor or to the human driver while the SDV encounters the current roadway condition based on which of the control processor competence level and the human driver competence level is relatively higher to one another.

30 Claims, 8 Drawing Sheets

Related U.S. Application Data continuation of application No. 15/955,874, filed on Apr. 18, 2018, now Pat. No. 10,717,446, which is a continuation of application No. 15/341,225, filed on Nov. 2, 2016, now Pat. No. 10,029,701, which is a continuation of application No. 14/865,393, filed on Sep. 25, 2015, now Pat. No. 9,566,986.

(51) Int. Cl.
  *B60W 40/10* (2012.01)
  *B60W 40/08* (2012.01)
  *B60W 40/06* (2012.01)
  *B60W 50/00* (2006.01)
  *B62D 1/28* (2006.01)
  *B62D 6/00* (2006.01)

(52) U.S. Cl.
  CPC ....... *B60W 50/0098* (2013.01); *G05D 1/0061* (2013.01); *B60W 2040/0809* (2013.01); *B60W 2050/0095* (2013.01); *B60W 2510/30* (2013.01); *B60W 2540/22* (2013.01); *B60W 2552/00* (2020.02); *B60W 2555/20* (2020.02); *B60W 2756/10* (2020.02); *B62D 1/286* (2013.01); *B62D 6/007* (2013.01); *G05D 2201/0213* (2013.01)

(56) References Cited

U.S. PATENT DOCUMENTS

| | | |
|---|---|---|
| 5,975,791 A | 11/1999 | McCulloch |
| 6,064,970 A | 5/2000 | McMillan et al. |
| 6,201,318 B1 | 3/2001 | Guillory |
| 6,326,903 B1 | 12/2001 | Gross et al. |
| 6,393,362 B1 | 5/2002 | Burns |
| 6,502,035 B2 | 12/2002 | Levine |
| 6,587,043 B1 | 7/2003 | Kramer |
| 6,622,082 B1 | 9/2003 | Schmidt et al. |
| 6,704,621 B1 | 3/2004 | Stein et al. |
| 6,731,202 B1 | 5/2004 | Klaus |
| 6,810,312 B2 | 10/2004 | Jammu et al. |
| 7,113,867 B1 | 9/2006 | Stein |
| 7,124,088 B2 | 10/2006 | Bauer et al. |
| 7,151,996 B2 | 12/2006 | Stein |
| 7,580,782 B2 | 8/2009 | Breed et al. |
| 7,769,544 B2 | 8/2010 | Blesener et al. |
| 7,877,269 B2 | 1/2011 | Bauer et al. |
| 7,894,951 B2 | 2/2011 | Norris et al. |
| 7,979,173 B2 | 7/2011 | Breed |
| 8,031,062 B2 | 10/2011 | Smith |
| 8,045,455 B1 | 10/2011 | Agronow et al. |
| 8,078,349 B1 | 12/2011 | Prada Gomez et al. |
| 8,090,598 B2 | 1/2012 | Bauer et al. |
| 8,139,109 B2 | 3/2012 | Schmiedel et al. |
| 8,140,358 B1 | 3/2012 | Ling et al. |
| 8,146,703 B2 | 4/2012 | Baumann et al. |
| 8,152,325 B2 | 4/2012 | McDermott |
| 8,180,322 B2 | 5/2012 | Nakae et al. |
| 8,346,480 B2 | 1/2013 | Trepagnier et al. |
| 8,352,112 B2 | 1/2013 | Mudalige |
| 8,442,854 B2 | 5/2013 | Lawton et al. |
| 8,466,807 B2 | 6/2013 | Mudalige |
| 8,489,434 B1 | 7/2013 | Otis et al. |
| 8,583,365 B2 | 11/2013 | Jang et al. |
| 8,660,734 B2 | 2/2014 | Zhu et al. |
| 8,676,466 B2 | 3/2014 | Mudalige |
| 8,678,701 B1 | 3/2014 | Aldasem |
| 8,786,461 B1 | 7/2014 | Daudelin |
| 8,810,392 B1 | 8/2014 | Teller et al. |
| 8,816,857 B2 | 8/2014 | Nordin et al. |
| 8,874,305 B2 | 10/2014 | Dolgov et al. |
| 8,880,270 B1 | 11/2014 | Ferguson et al. |
| 8,903,591 B1 | 12/2014 | Ferguson et al. |
| 8,923,890 B1 | 12/2014 | White et al. |
| 8,924,150 B2 | 12/2014 | Tsimhoni et al. |
| 8,948,955 B2 | 2/2015 | Zhu et al. |
| 8,949,016 B1 | 2/2015 | Ferguson et al. |
| 8,954,217 B1 | 2/2015 | Montemerlo et al. |
| 8,954,252 B1 | 2/2015 | Urmson et al. |
| 8,954,261 B2 | 2/2015 | Das et al. |
| 8,958,943 B2 | 2/2015 | Bertosa et al. |
| 8,965,621 B1 | 2/2015 | Urmson et al. |
| 8,970,362 B2 | 3/2015 | Morley et al. |
| 8,983,705 B2 | 3/2015 | Zhu et al. |
| 8,996,224 B1 | 3/2015 | Herbach et al. |
| 9,014,905 B1 | 4/2015 | Kretzschmar et al. |
| 9,024,787 B2 | 5/2015 | Alshinnawi et al. |
| 9,090,260 B2 | 7/2015 | Clarke et al. |
| 9,123,049 B2 | 9/2015 | Hyde et al. |
| 9,145,116 B2 | 9/2015 | Clarke et al. |
| 9,150,220 B2 | 10/2015 | Clarke et al. |
| 9,156,473 B2 | 10/2015 | Clarke et al. |
| 9,170,327 B2 | 10/2015 | Choe et al. |
| 9,189,897 B1 | 11/2015 | Stenneth |
| 9,194,168 B1 | 11/2015 | Lu et al. |
| 9,195,895 B1 | 11/2015 | Kapach et al. |
| 9,205,835 B2 | 12/2015 | Stein et al. |
| 9,216,745 B2 | 12/2015 | Beardsley et al. |
| 9,233,688 B2 | 1/2016 | Clarke et al. |
| 9,248,832 B2 | 2/2016 | Huberman |
| 9,272,709 B2 | 3/2016 | Ben Shalom |
| 9,286,520 B1 | 3/2016 | Lo et al. |
| 9,297,641 B2 | 3/2016 | Stein |
| 9,317,033 B2 | 4/2016 | Ibanez-Guzman et al. |
| 9,342,074 B2 | 5/2016 | Dolgov et al. |
| 9,365,214 B2 | 6/2016 | Ben Shalom et al. |
| 9,381,915 B1 | 7/2016 | Crombez et al. |
| 9,390,451 B1 | 7/2016 | Slusar |
| 9,393,998 B2 | 7/2016 | Clarke et al. |
| 9,399,472 B2 | 7/2016 | Minoiu-Enache |
| 9,415,777 B2 | 8/2016 | Clarke et al. |
| 9,443,163 B2 | 9/2016 | Springer |
| 9,446,765 B2 | 9/2016 | Ben Shalom et al. |
| 9,452,754 B2 | 9/2016 | Clarke et al. |
| 9,454,152 B2 * | 9/2016 | Kopetz ............... G05D 1/0061 |
| 9,463,805 B2 | 10/2016 | Kirsch et al. |
| 9,483,948 B1 | 11/2016 | Gordon et al. |
| 9,566,986 B1 | 2/2017 | Gordon et al. |
| 9,628,975 B1 | 4/2017 | Watkins et al. |
| 9,646,496 B1 | 5/2017 | Miller |
| 9,650,025 B2 | 5/2017 | Dagan |
| 9,650,058 B2 * | 5/2017 | Schiek ............... B60K 37/06 |
| 9,656,673 B2 | 5/2017 | Clarke et al. |
| 9,664,789 B2 | 5/2017 | Rosenblum et al. |
| 9,671,243 B2 | 6/2017 | Stein |
| 9,676,389 B2 | 6/2017 | Clarke et al. |
| 9,718,468 B2 | 8/2017 | Barfield, Jr. et al. |
| 9,881,427 B2 | 1/2018 | Barajas Gonzalez et al. |
| 10,101,742 B2 * | 10/2018 | Prokhorov ............ B60W 30/12 |
| 10,150,473 B2 | 12/2018 | Aharony et al. |
| 10,293,826 B2 | 5/2019 | Clarke et al. |
| 10,317,231 B2 | 6/2019 | Ferencz et al. |
| 10,318,823 B2 | 6/2019 | Shashua et al. |
| 10,572,744 B2 | 2/2020 | Shashua et al. |
| 2002/0026841 A1 | 3/2002 | Svendsen |
| 2002/0128774 A1 | 9/2002 | Takezaki et al. |
| 2003/0040864 A1 | 2/2003 | Stein |
| 2003/0065572 A1 | 4/2003 | McNee et al. |
| 2003/0076981 A1 | 4/2003 | Smith et al. |
| 2004/0078133 A1 | 4/2004 | Miller et al. |
| 2004/0117086 A1 | 6/2004 | Rao et al. |
| 2004/0199306 A1 | 10/2004 | Heilmann et al. |
| 2005/0021227 A1 | 1/2005 | Matsumoto et al. |
| 2005/0104745 A1 | 5/2005 | Bachelder et al. |
| 2006/0106671 A1 | 5/2006 | Biet |
| 2006/0163939 A1 | 7/2006 | Kuramochi et al. |
| 2006/0200379 A1 | 9/2006 | Biet |
| 2006/0241855 A1 | 10/2006 | Joe et al. |
| 2007/0100687 A1 | 5/2007 | Yoshikawa |
| 2007/0124027 A1 | 5/2007 | Betzitza et al. |
| 2008/0048850 A1 | 2/2008 | Yamada |
| 2008/0065293 A1 | 3/2008 | Placke et al. |
| 2008/0114663 A1 | 5/2008 | Watkins et al. |

(56) References Cited

U.S. PATENT DOCUMENTS

| | | |
|---|---|---|
| 2008/0129475 A1 | 6/2008 | Breed et al. |
| 2008/0201217 A1 | 8/2008 | Bader et al. |
| 2009/0094109 A1 | 4/2009 | Aaronson et al. |
| 2009/0114663 A1 | 5/2009 | Alvares et al. |
| 2009/0138168 A1 | 5/2009 | Labuhn et al. |
| 2009/0248231 A1 | 10/2009 | Kamiya |
| 2009/0313096 A1 | 12/2009 | Kaga |
| 2010/0057511 A1 | 3/2010 | Mansouri et al. |
| 2010/0156672 A1 | 6/2010 | Yoo et al. |
| 2010/0179720 A1 | 7/2010 | Lin et al. |
| 2010/0228427 A1 | 9/2010 | Anderson et al. |
| 2010/0256852 A1 | 10/2010 | Mudalige |
| 2011/0035250 A1 | 2/2011 | Finucan |
| 2011/0077807 A1 | 3/2011 | Hyde et al. |
| 2011/0137699 A1 | 6/2011 | Ben-Ari et al. |
| 2011/0264521 A1 | 10/2011 | Straka |
| 2012/0072243 A1 | 3/2012 | Collins et al. |
| 2012/0139756 A1 | 6/2012 | Djurkovic |
| 2012/0277947 A1 | 11/2012 | Boehringer et al. |
| 2012/0293341 A1 | 11/2012 | Lin |
| 2013/0030657 A1 | 1/2013 | Chatterjee et al. |
| 2013/0113634 A1 | 5/2013 | Hutchinson et al. |
| 2013/0131949 A1 | 5/2013 | Shida |
| 2013/0144502 A1 | 6/2013 | Shida |
| 2013/0147957 A1 | 6/2013 | Stein |
| 2013/0231824 A1 | 9/2013 | Wilson et al. |
| 2013/0261871 A1 | 10/2013 | Hobbs et al. |
| 2014/0019259 A1 | 1/2014 | Dung et al. |
| 2014/0032049 A1 | 1/2014 | Moshchuk et al. |
| 2014/0092332 A1 | 4/2014 | Price |
| 2014/0095214 A1 | 4/2014 | Mathe et al. |
| 2014/0129073 A1 | 5/2014 | Ferguson |
| 2014/0136045 A1 | 5/2014 | Zhu et al. |
| 2014/0136414 A1 | 5/2014 | Abhyanker |
| 2014/0164126 A1 | 6/2014 | Nicholas et al. |
| 2014/0188999 A1 | 7/2014 | Leonard et al. |
| 2014/0195213 A1 | 7/2014 | Kozloski et al. |
| 2014/0201037 A1 | 7/2014 | Mallawarachchi et al. |
| 2014/0201126 A1 | 7/2014 | Zadeh et al. |
| 2014/0214255 A1 | 7/2014 | Dolgov et al. |
| 2014/0214260 A1 | 7/2014 | Eckert et al. |
| 2014/0222277 A1 | 8/2014 | Tsimhoni et al. |
| 2014/0222577 A1 | 8/2014 | Abhyanker |
| 2014/0282967 A1 | 9/2014 | Maguire et al. |
| 2014/0297116 A1 | 10/2014 | Anderson et al. |
| 2014/0306833 A1 | 10/2014 | Ricci |
| 2014/0309789 A1 | 10/2014 | Ricci |
| 2014/0309806 A1 | 10/2014 | Ricci |
| 2014/0309864 A1 | 10/2014 | Ricci |
| 2014/0309891 A1 | 10/2014 | Ricci |
| 2014/0310186 A1 | 10/2014 | Ricci |
| 2014/0316671 A1 | 10/2014 | Okamoto |
| 2014/0324268 A1 | 10/2014 | Montemerlo et al. |
| 2014/0330479 A1 | 11/2014 | Dolgov et al. |
| 2014/0358331 A1 | 12/2014 | Prada Gomez et al. |
| 2014/0358353 A1 | 12/2014 | Ibanez-Guzman et al. |
| 2015/0006005 A1 | 1/2015 | Yu et al. |
| 2015/0006014 A1 | 1/2015 | Wimmer et al. |
| 2015/0026092 A1 | 1/2015 | Abboud et al. |
| 2015/0035685 A1 | 2/2015 | Strickland et al. |
| 2015/0051778 A1 | 2/2015 | Mueller |
| 2015/0057891 A1 | 2/2015 | Mudalige et al. |
| 2015/0062340 A1 | 3/2015 | Datta et al. |
| 2015/0062469 A1 | 3/2015 | Fleury |
| 2015/0066282 A1 | 3/2015 | Yopp |
| 2015/0066284 A1 | 3/2015 | Yopp |
| 2015/0070178 A1 | 3/2015 | Kline |
| 2015/0095190 A1 | 4/2015 | Hammad et al. |
| 2015/0103159 A1 | 4/2015 | Shashua et al. |
| 2015/0120331 A1 | 4/2015 | Russo et al. |
| 2015/0134178 A1 | 5/2015 | Minoiu-Enache |
| 2015/0137985 A1 | 5/2015 | Zafiroglu et al. |
| 2015/0141043 A1 | 5/2015 | Abramson et al. |
| 2015/0149018 A1 | 5/2015 | Attard et al. |
| 2015/0149021 A1 | 5/2015 | Duncan et al. |
| 2015/0151725 A1 | 6/2015 | Clarke et al. |
| 2015/0151742 A1 | 6/2015 | Clarke et al. |
| 2015/0151751 A1 | 6/2015 | Clarke et al. |
| 2015/0151753 A1 | 6/2015 | Clarke et al. |
| 2015/0153735 A1 | 6/2015 | Clarke et al. |
| 2015/0160019 A1 | 6/2015 | Biswal et al. |
| 2015/0166059 A1 | 6/2015 | Ko |
| 2015/0175070 A1 | 6/2015 | Attard et al. |
| 2015/0178998 A1 | 6/2015 | Attard et al. |
| 2015/0196256 A1 | 7/2015 | Venkatraman et al. |
| 2015/0210274 A1 | 7/2015 | Clarke et al. |
| 2015/0210275 A1 | 7/2015 | Huberman |
| 2015/0210276 A1 | 7/2015 | Ben Shalom et al. |
| 2015/0210277 A1 | 7/2015 | Ben Shalom |
| 2015/0210278 A1 | 7/2015 | Ben Shalom et al. |
| 2015/0210280 A1 | 7/2015 | Agnew et al. |
| 2015/0210312 A1 | 7/2015 | Stein et al. |
| 2015/0232065 A1 | 8/2015 | Ricci et al. |
| 2015/0234045 A1 | 8/2015 | Rosenblum et al. |
| 2015/0293994 A1 | 10/2015 | Kelly |
| 2015/0332104 A1 | 11/2015 | Kapach et al. |
| 2015/0332114 A1 | 11/2015 | Springer |
| 2015/0336547 A1 | 11/2015 | Dagan |
| 2015/0338226 A1 | 11/2015 | Mason et al. |
| 2015/0339639 A1 | 11/2015 | Choe |
| 2015/0354976 A1 | 12/2015 | Ferencz et al. |
| 2015/0367850 A1 | 12/2015 | Clarke et al. |
| 2016/0001781 A1 | 1/2016 | Fung et al. |
| 2016/0026182 A1 | 1/2016 | Boroditsky et al. |
| 2016/0046290 A1 | 2/2016 | Aharony et al. |
| 2016/0052514 A1 | 2/2016 | Clarke et al. |
| 2016/0063761 A1 | 3/2016 | Sisbot et al. |
| 2016/0075512 A1 | 3/2016 | Lea, Jr. |
| 2016/0078695 A1 | 3/2016 | McClintic et al. |
| 2016/0078758 A1 | 3/2016 | Basalamah |
| 2016/0090100 A1 | 3/2016 | Oyama et al. |
| 2016/0139594 A1 | 5/2016 | Okumura et al. |
| 2016/0140507 A1 | 5/2016 | Stevens et al. |
| 2016/0167650 A1 | 6/2016 | Clarke et al. |
| 2016/0176409 A1 | 6/2016 | Kirsch et al. |
| 2016/0229410 A1 | 8/2016 | Clarke et al. |
| 2016/0303969 A1 | 10/2016 | Akula |
| 2016/0304122 A1 | 10/2016 | Herzog et al. |
| 2016/0334797 A1 | 11/2016 | Ross et al. |
| 2016/0344737 A1 | 11/2016 | Anton et al. |
| 2016/0347322 A1 | 12/2016 | Clarke et al. |
| 2016/0355192 A1 | 12/2016 | James et al. |
| 2016/0358477 A1 | 12/2016 | Ansari |
| 2016/0364823 A1 | 12/2016 | Cao |
| 2017/0010613 A1 | 1/2017 | Fukumoto |
| 2017/0088143 A1 | 3/2017 | Goldman-Shenhar et al. |
| 2017/0098131 A1 | 4/2017 | Shashua et al. |
| 2017/0129487 A1 | 5/2017 | Wulf |
| 2017/0137023 A1 | 5/2017 | Anderson et al. |
| 2017/0151958 A1 | 6/2017 | Sakuma |
| 2017/0168689 A1 | 6/2017 | Goldman-Shenhar et al. |
| 2017/0200449 A1 | 7/2017 | Penilla et al. |
| 2017/0248949 A1 | 8/2017 | Moran et al. |
| 2018/0075309 A1 | 3/2018 | Sathyanarayana et al. |
| 2018/0093631 A1 | 4/2018 | Lee et al. |

FOREIGN PATENT DOCUMENTS

| | | |
|---|---|---|
| CN | 2349068 Y | 11/1999 |
| CN | 201004265 Y | 1/2008 |
| CN | 202012052 U | 10/2011 |
| CN | 202038228 U | 11/2011 |
| CN | 102650882 A | 8/2012 |
| CN | 202772924 U | 3/2013 |
| CN | 104900018 A | 9/2015 |
| CN | 106030609 A | 10/2016 |
| CN | 106462727 A | 2/2017 |
| CN | 107111742 A | 8/2017 |
| CN | 110920609 A | 3/2020 |
| CN | 111027420 A | 4/2020 |
| EP | 1727089 A2 | 11/2006 |
| EP | 2605185 A2 | 6/2013 |
| EP | 3100206 A1 | 12/2016 |
| EP | 3108264 A2 | 12/2016 |

(56) References Cited

FOREIGN PATENT DOCUMENTS

| | | |
|---|---|---|
| EP | 3514032 A1 | 7/2019 |
| EP | 3146506 B1 | 12/2019 |
| EP | 3640890 A1 | 4/2020 |
| EP | 3680818 A1 | 7/2020 |
| WO | 2014058263 A1 | 4/2014 |
| WO | 2014066721 A2 | 5/2014 |
| WO | 2014066721 A3 | 6/2014 |
| WO | 2014147361 A1 | 9/2014 |
| WO | 2014148975 A1 | 9/2014 |
| WO | 2014148976 A1 | 9/2014 |
| WO | 2015024616 A1 | 2/2015 |
| WO | 2015056105 A1 | 4/2015 |
| WO | 2015083009 A1 | 6/2015 |
| WO | 2015125022 A2 | 8/2015 |
| WO | 2015156146 A1 | 10/2015 |
| WO | 2015125022 A3 | 11/2015 |
| WO | 2015186002 A2 | 12/2015 |
| WO | 2015189847 A1 | 12/2015 |
| WO | 2016027270 A1 | 2/2016 |
| WO | 2015186002 A3 | 3/2016 |

OTHER PUBLICATIONS

Nelson, G.: "Tesla beams down 'autopilot' mode to Model S," Automotive News, Oct. 14, 2015.
Lawler, R.: "Riding shotgun in Tesla's fastest car ever," Engadget, Oct. 9, 2018.
P. Mell et al., "The NIST Definition of Cloud Computing", National Institute of Standards and Technology, Information Technology Laboratory, Sep. 2011, pp. 1-7.
X. Jardin, Terrifying dashcam video captures distracted teen drivers crashing while goofing off, Boing Boing, www.boingboing.net, Mar. 26, 2015, pp. 1-2.
M. Fox, "Self-driving cars safer than those driven by humans: Bob Lutz", CNBC, www.cnbc.com, Sep. 8, 2014, 1 page.
List of IBM Patents or Patent Applications Treated as Related, Apr. 18, 2018.
A. Abkowitz, "Do Self-Driving Cars Spell Doom for Auto Insurers?", Bloomberg L.P., Sep. 10, 2014, pp. 1-2.
Anonymous, "Self-Driving Cars and Insurance", Insurance Information Institute, Inc., Feb. 2015, 99. 1-3.
Gomes, Lee. "Google's Self-Driving Cars Still Face Many Obstacles / MIT Technology Review.", MIT Technology Review. Aug. 28, 2014. Web. <http://www.technologyreview.co,/news/530276/hidden-obstacles-for-googles-self-driving-cars/>.
Smith, Mark. "Innovations: Emerging Trends in the Wheelchair Market." New Mobility Magazine, Aug. 1, 2014. Web. <http://www.newmobility.com/2014/08/emerging-trends/>.
Crothers, Brooke "Google Now Reporting Self-Driving Car Accidents: Hy, Its Not the Car's Fault." forbes.com, Jun. 8, 2015. <http://www.forbes.com/sites/brookecrothers/2015/06/08/google-now-reporting-driverless-car-accidents/>.
Anonymous, "System and Method to Target Advertisements for the Right Focus Group". ip.com, No. 000218285, May 31, 2012, pp. 1-2.
Anonymous, "Car Built-In Mechanism to Enforce Mandatory Self-Driving Mode", ip.com, No. 000234916, Feb. 14, 2014, pp. 1-3.

T. Horberry et al., "Driver Distraction: The Effects of Concurrent In-Vehicle Tasks, Road Environment Complexity and Age on Driving Performance", Elsevier Ltd., Accident Analysis and Prevention, 38, 2006, pp. 185-191.
J. Miller, "Self-Driving Car Technology's Benefits, Potential Risks, and Solutions", The Energy Collective, theenergycollective.com, Aug. 19, 2014, pp. 1-7.
J. O'Callaghan, "Inside the Mercedes Self-Guiding Car That's Built for Luxurious Living in, Not Driving", Associated Newspapers Ltd., Daily Mail, dailymail.com.uk, Jan. 6, 2015, pp. 1-3.
J. Wei et al., "Towards a Viable Autonomous Driving Research Platform", IEEE, Intelligent Vehicles Symposium (iv), 2013, pp. 1-8.
J. Farrier, "Airlies Infuse Their Planes With Smells to Calm You Down", Neatorama, neatorama.com, Mar. 29, 2015, 1 Page.
T. Vanderbilt, "Let the Robot Drive: The Autonomous Car of the Future is Here", Wired Magazine, Conde Nast, www.wired.com, Jan. 20, 2012. pp. 1-34.
Chen S, et al., A Crash Risk Assessment Model for Road Curves. Inproceedings 20th International Technical Conference on the Enhanced Safety of Vehicles., 2007. Lyon, France.
E. Lehrer, "The Insurance Implications of Google's Self-Driving Car", Insurance Journal, Right Street Blog, May 28, 2014, pp. 1-2.
Anonymous, "Diagnostics Mechanism for Self-Driving Cars to Validate Self-Driving Capabilities", ip.com, Jun. 6, 2014, pp. 1-5. ip.com.
Brownell, "Shared Autonomous Taxi Networks: An Analysis of Transportation Demand in NJ and a 21st Century Solution for Congestion", Dissertation, Princeton University, 2013, pp. 1-122.
Sessa et al., "Blueprint of Alternative City Cyber-Mobility Take-U Scenarios", Seventh Framework Programme Theme SST. 2012.3. 1-4, Automated Urban Vehicles Collaboraite Project—Grant Agreement No. 314190, 2013, pp. 1-63.
Lutin et al., "The Revolutionary Development of Self-Driving Vehicles and Implications for the Transportation Engineering Profession", ITE Journal 83.7, 2013, pp. 28-32.
A. Hars, "Self-Driving Cars: The Digital Transformation of Mobility", Marktplatze Im Umbrush, Springer Berlin Heidelberg, 2015, pp. 539-549.
Jimenez et al.; "Autonomous collision avoidance system based on accurate knowledge of the vehicle surroundings", Inst Engineering Technology-IET; IET Intelligent Transport Systems vol. 9, No. 1, pp. 105-117; 2015; England.
Anonymous, "Avoiding Crashes With Self-Driving Cars: Today's Crash-Avoidance Systems are the Mile Markers to Tomorrows Autonomous Vehicles". Consumer Reports Magazine, Feb. 2014. Web. Sep. 22, 2016. <http://www.consumerreports.org/cro/magazine/2014/04/the-road-to-self-driving-cars/index.htm>.
Anonymous, "Google Files Patent for Second-Gen Autonomous Vehicle Without a Steering Wheel, Brake Pedal & More". patentlymobile.com Nov. 27, 2015. Web. Sep. 22, 2016. <http://www.patentlymobile.com/2015/11/GOOGLE-FILES-PATENT-FOR-SECOND-GEN-AUTONOMOUS-VEHICLE-WITHOUT-A-STEERING-WHEEL-BRAKE-PEDAL-MORE.HTML>.
C. Berger et al., "Cots-Architecture With a Real-Time OS for a Self-Driving Miniature Vehicle", Safecomp 2013—Workshop ASCOMS of the 32nd International Confernce on Computer Safety, Reliability and Security, Sep. 2013, Toulouse, France, pp. 1-13.

* cited by examiner

CONTROLLING DRIVING MODES OF SELF-DRIVING VEHICLES

CROSS-REFERENCE TO RELATED APPLICATIONS

This application is a continuation of U.S. Pat. No. 10,717,446, filed Apr. 18, 2018, which is a continuation of U.S. Pat. No. 10,029,701, filed on Nov. 2, 2016, which is a continuation of U.S. Pat. No. 9,566,986, filed on Sep. 25, 2015, incorporated by reference herein.

BACKGROUND

The present disclosure relates to the field of vehicles, and specifically to the field of self-driving vehicles. Still more specifically, the present disclosure relates to the field of controlling whether self-driving vehicles operate in autonomous mode or manual mode.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

A computer-implemented method, system, and/or computer program product controls a driving mode of a self-driving vehicle (SDV). One or more processors determine a control processor competence level of a self-driving vehicle (SDV) control processor. The control processor competence level describes a competence level of the SDV control processor in controlling the SDV while the SDV experiences the current operational anomaly. One or more processors receive a driver profile of the human driver of the SDV. The driver profile describes a human driver competence level of the human driver in controlling the SDV while the SDV experiences the current operational anomaly. One or more processors compare the control processor competence level to the human driver competence level. One or more processors then selectively assign control of the SDV to the SDV control processor or to the human driver while the SDV experiences the current operational anomaly based on which of the control processor competence level and the human driver competence level is relatively higher to one another.

DETAILED DESCRIPTION

Figure 1:
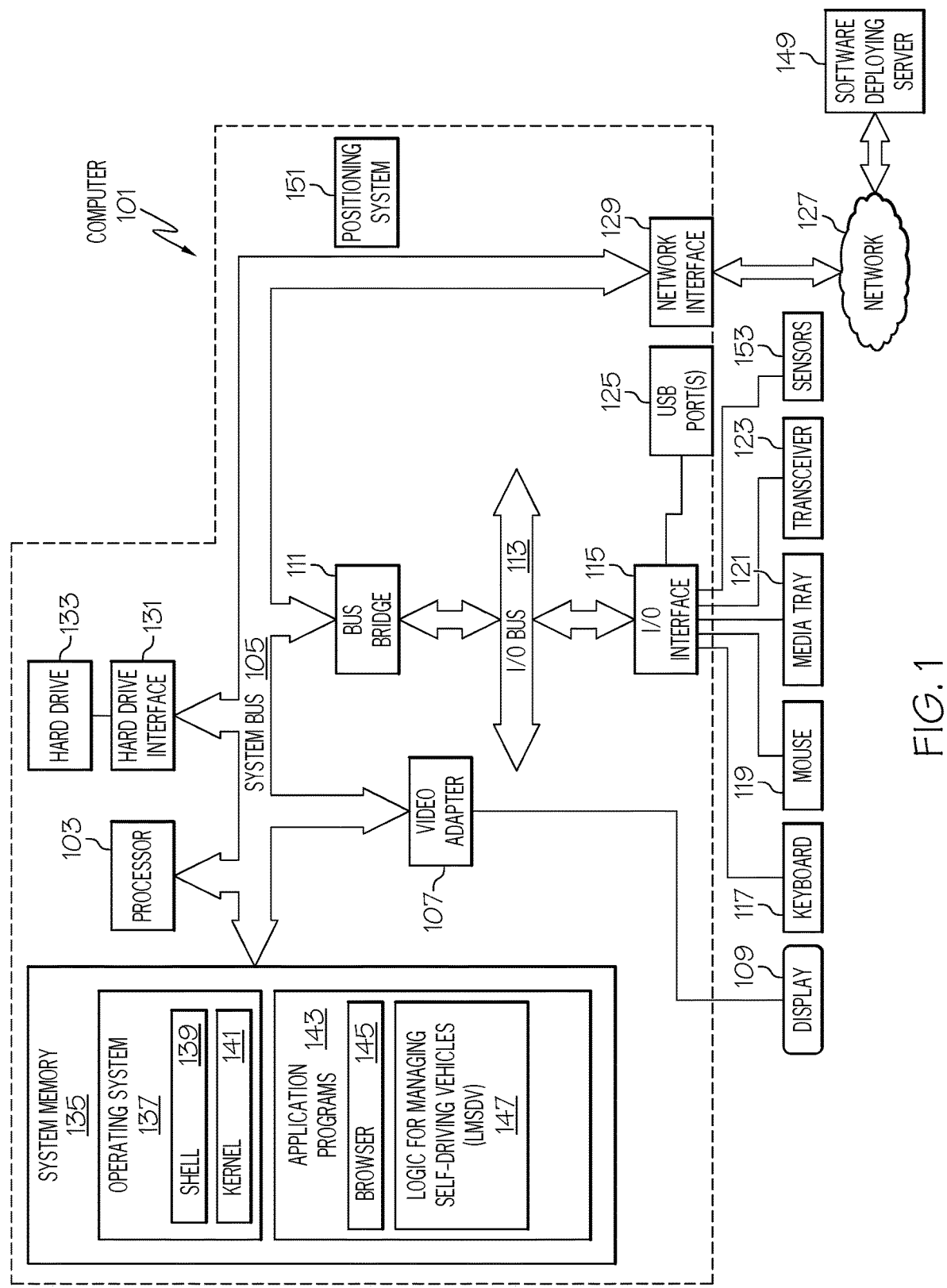
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, and/or coordinating server 201 and/or roadway monitoring system 208 shown in FIG. 2, and/or a self-driving vehicle (SDV) on-board computer 301 shown in FIG. 3, and/or a coordinating server 401 depicted in FIG. 4.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., establishing communication among SDV 202, SDV 210, and/or roadway monitoring system 208 depicted in the figures below) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Managing Self-Driving Vehicles (LMSDV) 147. LMSDV 147 includes code for implementing the processes described below, including those described in FIGS. 2-5. In one embodiment, computer 101 is able to download LMSDV 147 from software deploying server 149, including in an on-demand basis, wherein the code in LMSDV 147 is not downloaded until needed for execution. In one embodiment of the present invention, software deploying server 149 performs all of the functions associated with the present invention (including execution of LMSDV 147), thus freeing computer 101 from having to use its own internal computing resources to execute LMSDV 147.

Also within computer 101 is a positioning system 151, which determines a real-time current location of computer 101 (particularly when part of an emergency vehicle and/or a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101. More specifically, sensors 153 are able to detect vehicles, road obstructions, pavement, etc. For example, if computer 101 is on board a self-driving vehicle (SDV), then sensors 153 may be cameras, radar transceivers, etc. that allow the SDV to detect the environment (e.g., other vehicles, road obstructions, pavement, etc.) of that SDV, thus enabling it to be autonomously self-driven. Similarly, sensors 153 may be cameras, thermometers, moisture detectors, etc. that detect ambient weather conditions.

In another embodiment, sensors 153 are sensors that detect an operational state of an SDV, including anomalous states such as, but not limited to, a presence of snow tires mounted on the SDV during a first road condition of the roadway, an absence of snow tires mounted on the SDV during a second road condition of the roadway, tire pressure in a tire mounted on the SDV being below a predetermined level, tire tread on a tire mounted on the SDV being less than a predefined limit, a windshield wiper edge of a windshield wiper mounted on the SDV being less than a predefined width, a level of windshield washer fluid in a windshield washer fluid reservoir mounted on the SDV being less than a predefined volume, an inoperable headlamp mounted on the SDV, condensation frosting of windows on the SDV exceeding a predetermined limit, a failure of an antilock breaking system in the SDV, a failure of an all wheel traction system in the SDV, and a faulty braking system in the SDV.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

The present invention describes a self-driving vehicle (SDV) traveling on a roadway. First, at any point in time the SDV may be in autonomous mode or manual mode, as described and discussed in detail herein. Second, the "roadway" upon which the SDV is traveling is defined as any surface capable of supporting the weight of the SDV, including but not limited to public streets, public highways, toll roads, parking lots, private road, open fields, etc. The streets/roads/lots may be paved or unpaved.

Figure 2:
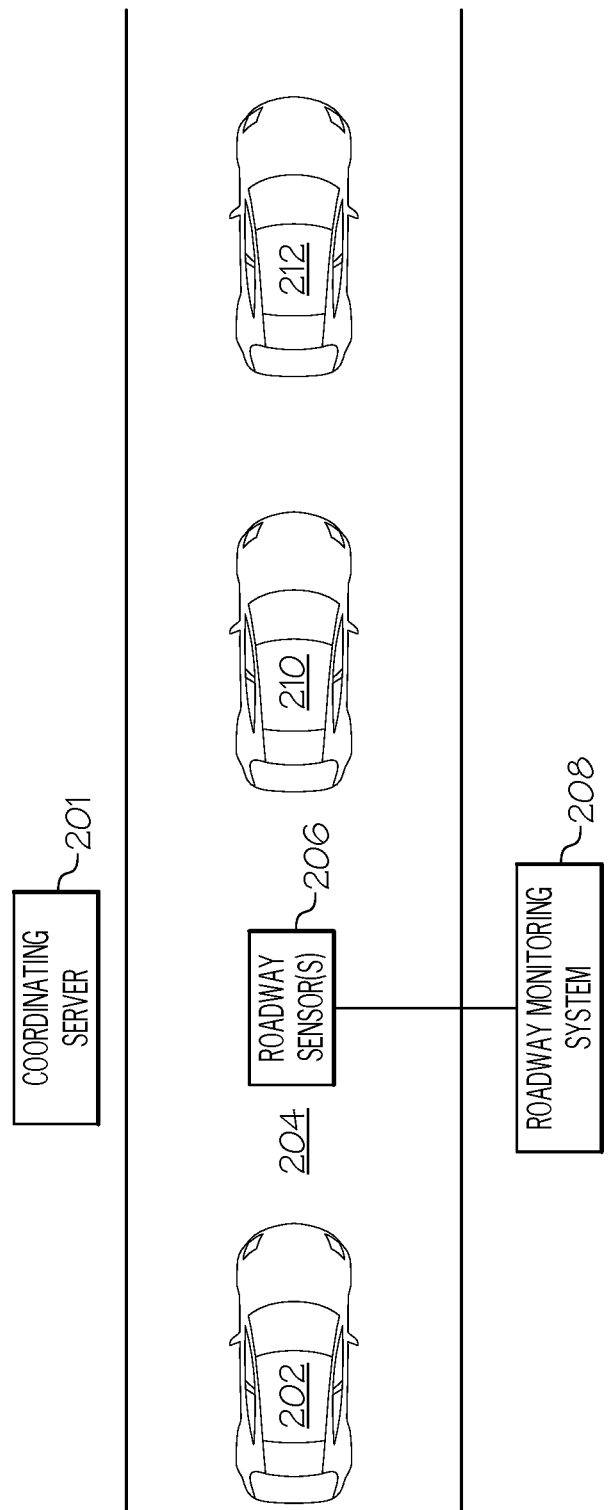
FIG. 2 illustrates an exemplary self-driving vehicle (SDV) traveling on a roadway in accordance with one or more embodiments of the present invention.

With reference now to FIG. 2, an exemplary self-driving vehicle (SDV) 202 traveling along a roadway 204 in accordance with one or more embodiments of the present invention is presented. Additional details of one or more embodiments of the SDV 202 (which may have a same architecture as SDV 210 and/or SDV 212, which are discussed below) are presented in FIG. 3.

Figure 3:
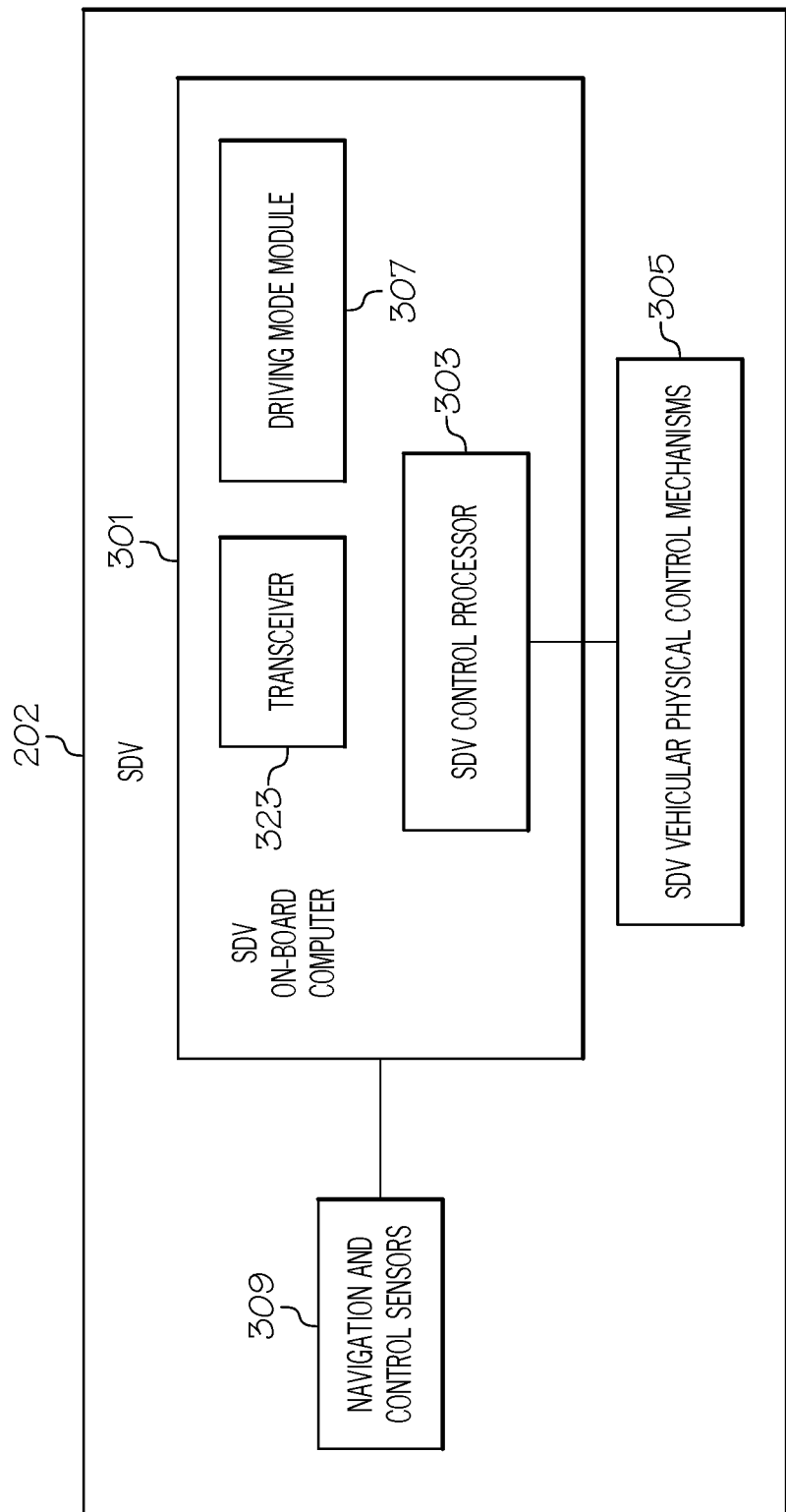
FIG. 3 depicts additional detail of control hardware within an SDV.

As shown in FIG. 3, SDV 202 has an SDV on-board computer 301 that controls operations of the SDV 202. According to directives from a driving mode module 307, the SDV 202 can be selectively operated in manual mode or autonomous mode. In a preferred embodiment, driving mode module 307 is a dedicated hardware device that selectively directs the SDV on-board computer 301 to operate the SDV 202 in autonomous mode or manual mode.

While in manual mode, SDV 202 operates as a traditional motor vehicle, in which a human driver controls the engine throttle, engine on/off switch, steering mechanism, braking system, horn, signals, etc. found on a motor vehicle. These vehicle mechanisms may be operated in a "drive-by-wire" manner, in which inputs to an SDV control processor 303 by the driver result in output signals that control the SDV vehicular physical control mechanisms 305 (e.g., the engine throttle, steering mechanisms, braking systems, turn signals, etc.).

While in autonomous mode, SDV 202 operates without the input of a human driver, such that the engine, steering mechanism, braking system, horn, signals, etc. are controlled by the SDV control processor 303, but now under the control of the SDV on-board computer 301. That is, by processing inputs taken from navigation and control sensors 309 and the driving mode module 307 indicating that the SDV 202 is to be controlled autonomously, then driver inputs are no longer needed.

As just mentioned, the SDV on-board computer 301 uses outputs from navigation and control sensors 309 to control the SDV 202. Navigation and control sensors 309 include hardware sensors that 1) determine the location of the SDV 202; 2) sense other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure rates of changes to a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., transceiver 323). By measuring the time it takes to receive back the emitted electromagnetic radiation, and/or evaluating a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 301.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202.

Returning to FIG. 2, current conditions of the roadway 204, including weather conditions, traffic conditions, the quantity of vehicles traveling along roadway 204, the speed of vehicle traveling along roadway 204, construction events, accident events, etc., can be determined and transmitted by the roadway monitoring system 208. That is, roadway monitoring system 208 is able to determine current roadway conditions of roadway 204 based on internal sensors 153 shown in FIG. 1, and/or from information received from SDV 202 and/or SDV 210 and/or SDV 212, and/or from information received by an information service (e.g., a weather station), and or from information received by roadway sensor(s) 206 (e.g., thermometers, moisture detectors, vehicle detectors, etc. that are laid on top or and/or embedded within roadway 204).

In accordance with one or more embodiments of the present invention, SDV 202 is selectively placed into autonomous mode or manual mode (described above) based on a detection of a vehicle fault in SDV 202. Exemplary vehicle faults include, but are not limited to the presence or absence of snow tires when required or not required, inadequate tire pressure, inadequate tire tread, inadequate windshield wiper edge, inadequate windshield washer fluid, headlamp failure, extreme amounts of water on windows or under tires, window frosting, snow on the windows/windshield, ice on the windows/windshield, improper wheel alignment, excessive brake wear (i.e., brake pads being worn down such that less than a predefined amount of brake material is left), antilock brake failure, all wheel traction failure, and/or inadequate braking. A threshold for seriousness of the fault may be applied to vehicle measures in order to determine if the switch (from manual mode to autonomous mode or vice versa) is required. Vehicle faults may also be results of bugs (software, firmware, hardware bugs), or single-event upsets, that get reproduced in certain conditions.

Thus in one or more embodiments of the present invention, a vehicle monitoring system (e.g., SDV on-board computer 301 shown in FIG. 3) detects a vehicle fault in the SDV. Based on the detected fault exceeding a threshold for danger, the SDV either switches from autonomous mode to manual mode or from manual mode to autonomous mode.

In one embodiment of the present invention, the vehicle monitoring system alters a route being taken by the SDV to a location where the fault may be remedied (e.g., a service station).

In one embodiment of the present invention, the vehicle monitoring system alters the route being taken by the SDV based on the severity of the fault (e.g., pulling over and stopping immediately, traveling to the nearest service station, traveling to the nearest dealership, returning to the owner's home, etc.).

In one embodiment of the present invention, the vehicle monitoring system has a fault-remediation table, where each row refers to a fault condition, a first column refers to a condition that gets manifested by that fault, and a second column that refers to the mode in which the vehicle should be driven when that condition is manifested. For example, a row may refer to a fault in the traction control system on the vehicle, the first column in that row may indicate that this fault is manifested by the vehicle hydroplaning, and the second column in that row may indicate that the vehicle needs to be taken out of autonomous mode and placed into manual mode, thus allowing the driver to manually control the speed and steering to stop the hydroplaning, which the automatic traction control system is unable to do. In one embodiment, this table is updated from a central server or offline systems based on other SDVs responding to the same fault. Thus, the SDV is able to apply the information from the table and changes driving mode as and when needed.

In one embodiment of the present invention, a driver profile provides an indication of the driver's physical or other abilities. This information is then used to further determine whether the SDV should be in autonomous or manual mode.

In one embodiment of the present invention, a further analysis of whether to place the SDV in autonomous or manual mode is performed if more than one person is in the vehicle (thus creating a possible distraction for the driver).

In one embodiment of the present invention, a further analysis of whether to place the SDV in autonomous or manual mode is performed if a person and a pet are in the same vehicle (another possible distraction for the driver).

In one or more embodiments of the present invention a weighted voting system is used to weight the various variables used in making the decision that is triggered by faults. Such inputs may include: a history of faults by one or more cars such as SDV 210 and SDV 212 shown in FIG. 2 (and the likely affects of such faults), votes by nearby cars, etc. Such weighted voting approaches may be characterized primarily by three aspects—the inputs, the weights, and the quota. The inputs are $(I1, I2, \ldots, IN)$, where N denotes the total number of inputs. An input's weight (w) is the number of "votes" associated with the input. The quota (q) is the minimum number of votes required to "pass a motion", which in this case refers primarily to a decision made to place the SDV in manual mode or autonomous mode.

In one or more embodiments of the present invention, active learning is employed so that the system as a whole learns from the experiences of many SDVs and drivers, in different geographies and among cohorts. Geographies may include cities, rural areas, and the like. Cohorts may include people with certain characteristics, disabilities, etc.

Thus, the present invention allows switching between human operated (manual mode) and self-driving modes (autonomous modes) that takes into account the vehicle's operational condition and expected tolerances of the vehicle to the different modes. Since unexpected changes to vehicle condition can cause an immediate response by utilizing the present invention, safety of the vehicle is optimized. Furthermore, self-diagnosis of faults can result in an immediate change in vehicle location to optimally resolve the fault (for example, to drive to the nearest flat tire repair shop).

Besides the condition of the SDV 202, the condition of roadway 204 and/or SDV 210 and/or SDV 212 is also used to determine whether to place SDV 202 in manual mode or autonomous mode. For example, if roadway is very narrow or runs along the side of a cliff, then SDV 202 likely would be safer if in autonomous mode. Similarly, if SDV 210 is experiencing a flat tire (as detected by an SDV on-board computer 301 within SDV 210), this fault condition is relayed to the SDV on-board computer 301 within SDV 202, either directly or via the coordinating server 201. Using this information will prompt the SDV on-board computer 301 within SDV 202 to place SDV 202 into autonomous mode, which is better at handling unexpected movement of vehicles (e.g., the sudden slowing down and/or lateral movement of SDV 210).

Figure 4:
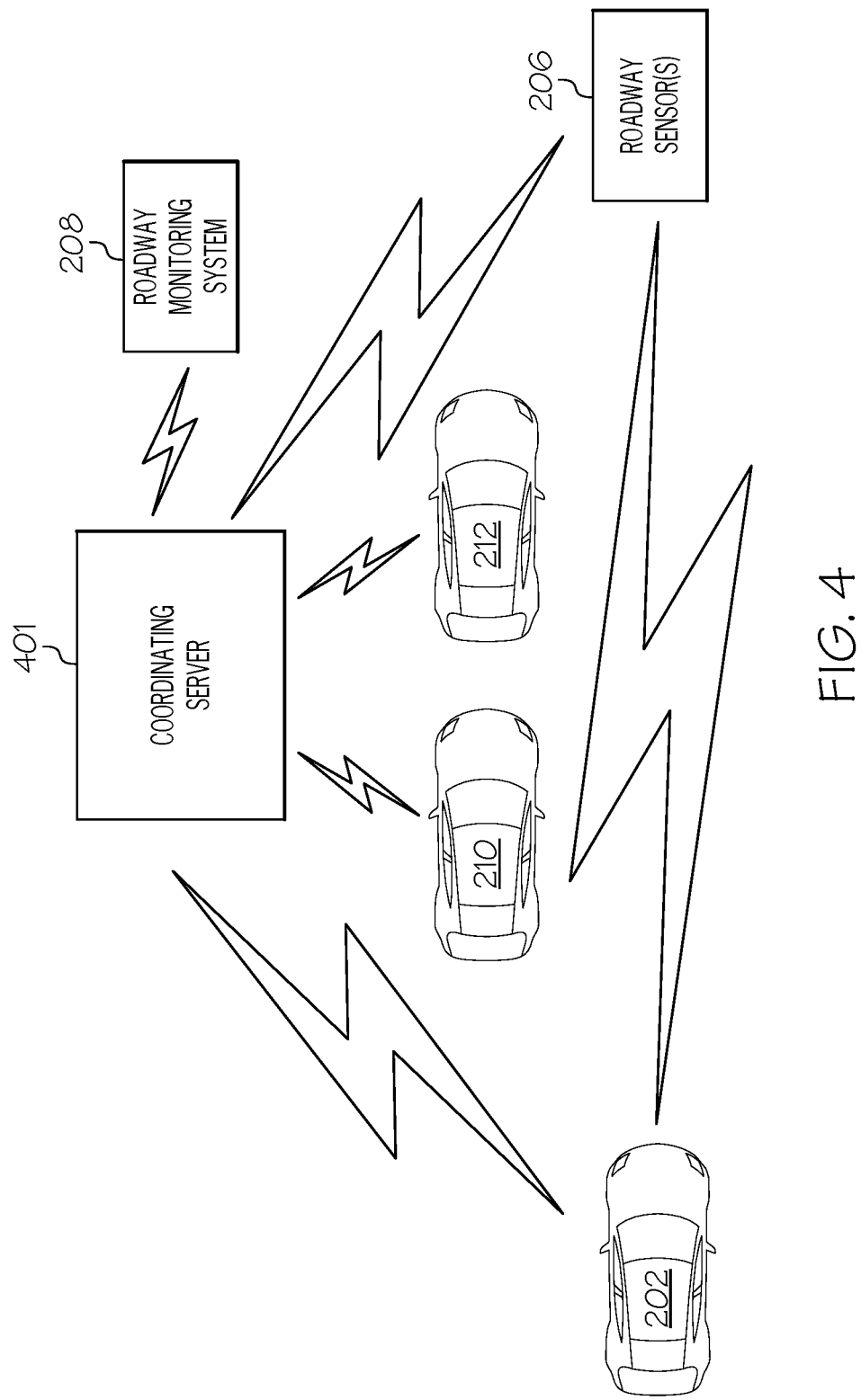
FIG. 4 depicts communication linkages among SDVs, roadway sensor(s), a roadway monitoring system, and/or a coordinating server.

As depicted in FIG. 4, coordinating server 401 (analogous to coordinating server 201 shown in FIG. 2) and/or SDV 202 and/or SDV 210 and/or SDV 212 and/or roadway monitoring system 208 and/or roadway sensor(s) 206 (all introduced in FIG. 2) are able to communicate with one another wirelessly, using a wireless transceiver (e.g., transceiver 123 shown in FIG. 1) that is found in each of the coordinating server 401 and/or SDV 202 and/or SDV 210 and/or SDV 212 and/or roadway monitoring system 208 and/or roadway sensor(s) 206. This wireless communication optimizes the decision to place SDV 202 in autonomous or manual mode by taking information from SDV 202 and/or SDV 210 and/or SDV 212 and/or roadway monitoring system 208 and/or roadway sensor(s) 206 in order to determine which mode (autonomous or manual) to place SDV 202 in.

Figure 5:
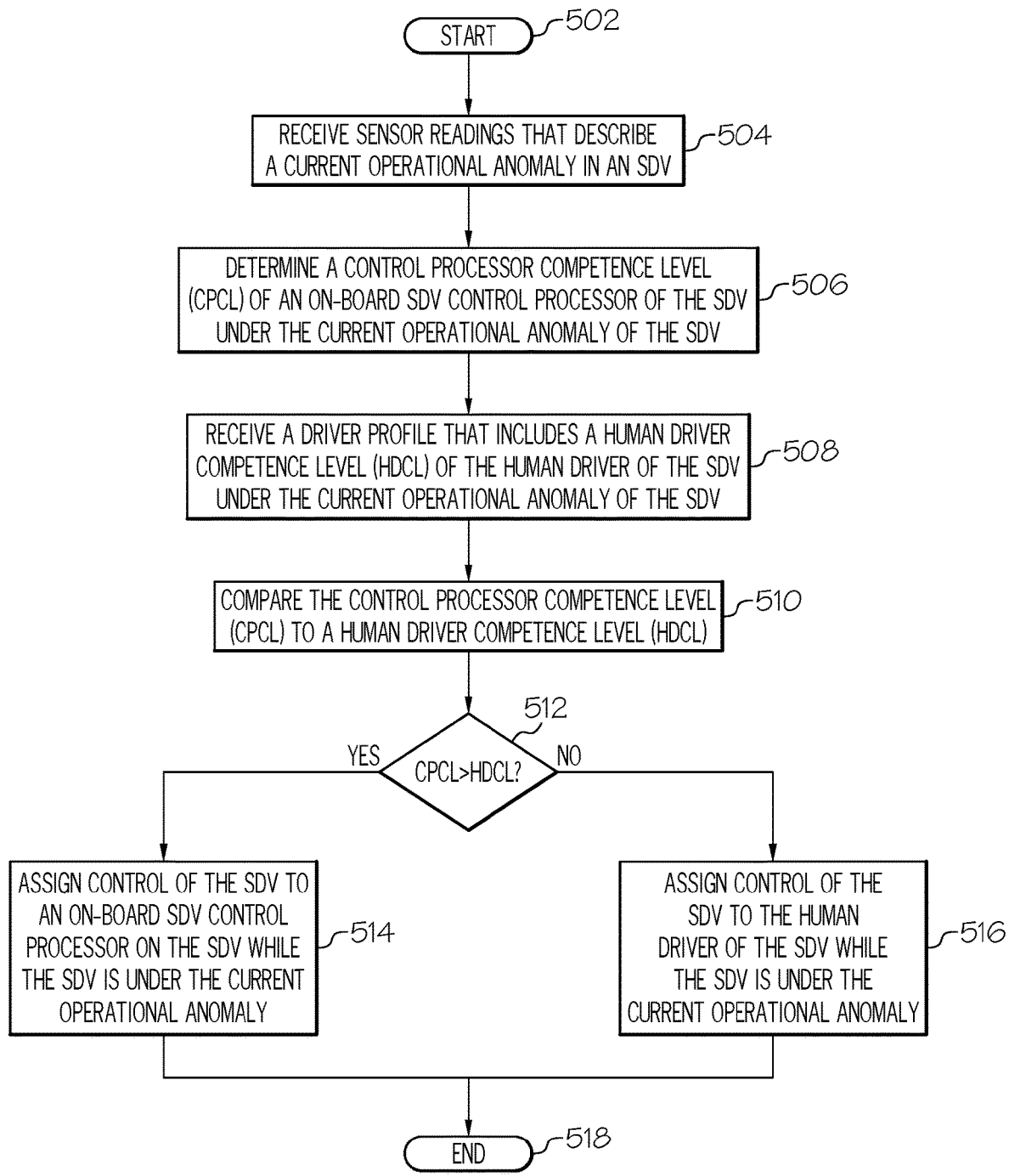
FIG. 5 is a high-level flow chart of one or more steps performed by one or more processors to control a driving mode of an SDV in accordance with one or more embodiments of the present invention.

With reference now to FIG. 5, a high-level flow chart of one or more steps performed by one or more processors to control a driving mode of an SDV in accordance with one or more embodiments of the present invention is presented.

After initiator block 502, one or more processors (e.g., processor 103 shown in FIG. 1) receive sensor readings from a sensor (e.g., one or more of the sensors 153 shown in FIG. 1), as described in block 504. These sensor readings describe a current operational anomaly of an SDV (e.g., SDV 202 shown in FIG. 2). This current operational anomaly may be a software bug in a control system for the SDV; worn down brake pads; worn down or tearing windshield wipers; a malfunctioning drivetrain; etc.

The SDV is capable of being operated in autonomous mode by an on-board SDV control processor (e.g., SDV control processor 303 shown in FIG. 3) that is under the direct control of an SDV on-board computer (e.g., SDV on-board computer 301) or another computer system (e.g., coordinating server 401 shown in FIG. 4). A driving mode module selectively controls whether the SDV is operated in the autonomous mode (by the on-board SDV control processor) or in manual mode (in which the SDV is controlled by a human driver of the SDV).

As shown in block 506, one or more processors determine a control processor competence level of the on-board SDV control processor. The control processor competence level describes a competence level of the on-board SDV control processor in controlling the SDV while the SDV experiences the current operational anomaly. Various approaches may be used to determine this control processor competence level.

In one embodiment of the present invention, the control processor competence level of the on-board SDV control processor is history-based. That is, a record is reviewed on how effective the on-board SDV control processor has been in controlling the current SDV 202 or similar types of SDVs (i.e., SDVs that have the same design and/or performance characteristics as SDV 202) in situations in which the SDV are experiencing the same type of operational anomaly (e.g., tires with poor tread depth). This effectiveness may be based on past 1) accident frequency, 2) travel speed, 3) stopping and starting, 4) gas mileage, etc. That is, the control processor competence level of the on-board SDV control processor describes how well the on-board SDV control processor has been controlling SDV 202 or similar SDVs in terms of safety, cost, consistency, etc. when the current operational anomaly occurs within the SDV(s).

In one embodiment of the present invention, the control processor competence level of the on-board SDV control processor is based on an analysis of capability of the on-board SDV control processor. That is, a review of what control features can be handled by the on-board SDV control processor is used to define the control processor competence level of the on-board SDV control processor. For example, assume that such a review confirms that the on-board SDV control processor is able to control the speed of the SDV 202 (i.e., "cruise control"), but nothing else. As such, the control processor competence level of this on-board SDV control processor is relatively low when compared to an on-board SDV control processor that is able to automatically maintain safety distances (buffers of space) between other vehicles. Similarly, the control processor competence level of the on-board SDV control processor that can also maintain safety space cushions around the SDV has a control processor competence level that is lower than an on-board SDV control processor that is able to not only control the speed and safety cushion around the SDV, but can also control the steering of the SDV.

As described in block 508 of FIG. 5, one or more processors receive a driver profile of the human driver of the SDV. This driver profile describes a human driver competence level of the human driver in controlling the SDV while the SDV experiences the current operational anomaly. That is, a driver may be very good at safely controlling the SDV when the air conditioning system on the SDV is working improperly, but may be very poor at safely controlling the SDV when the antilock braking system is not working and it is raining on the roadway.

In one embodiment of the present invention, the human driver competence level of the human driver is history-based. That is, a record is reviewed on how effectively this driver has controlled the current SDV 202 or similar types of SDVs that are experiencing the same operational anomaly as currently being experienced by SDV 202. This effectiveness may be based on past 1) accident frequency, 2) travel speed, 3) stopping and starting, 4) gas mileage, etc. That is, the human driver competence level of the human driver describes how well the current driver has controlled this or similar SDVs in terms of safety, cost, consistency, etc. in the past under the anomalous conditions being experienced by the vehicle.

In one embodiment of the present invention, the human driver competence level of the human driver is based on an analysis of capability of this human driver based on his traits/profile. That is, a review of this human driver's traits can lead to a conclusion regarding the strengths and weaknesses of this driver. For example, if this human driver has a record of poor night vision (as evidenced by a restriction on his/her license preventing him from driving at night), then the competence level of this driver to control a vehicle when a headlight is burned out is low.

As described in block 510 in FIG. 5, one or more processors then compare the control processor competence level to the human driver competence level. In order to compare these two levels, different approaches can be taken.

In one embodiment of the present invention, each control factor (e.g., driving the SDV at night) is compared using the on-board SDV control processor versus the human driver. Each control factor that is relevant to the current operational anomaly of the SDV (e.g., driving at night in rainy conditions) is evaluated for both the on-board SDV control processor and the human driver. The control factors are then summed, in order to determine whether the on-board SDV control processor of the human driver is better at handling the SDV while the SDV is experiencing the current operational anomaly.

In one embodiment of the present invention, the control factors being compared and evaluated (for the on-board SDV control processor versus the human driver) are weighted according to their predetermined significance to the overall control of the SDV. For example, a review of all traffic accidents may show that failure to properly control spatial cushions between vehicles caused more accidents than failing to signal. Therefore, the control factor of failing to maintain spatial buffers around the vehicle is weighted more heavily than the control factor of controlling turn signals.

In one embodiment of the present invention, the control processor competence level and/or the human driver competence level are purely outcome based. That is, a history of safety, fuel efficiency, traffic flow (consistent or speeding up/slowing down), etc. of SDVs that are experiencing the operational anomaly are compared when being driven by the type of on-board SDV control processor in use by SDV 202 to a human driver having a similar profile as the current driver of the SDV 202. Whichever type of operator (i.e., the on-board SDV control processor of the human driver) has been able to drive the SDV, under operational anomalous conditions similar to the current operational condition being experienced by the SDV, in a safer and more efficient manner is deemed to have a higher competence level.

A shown in query block 512, a query is made as to which competence level is higher: the control processor competence level (CPCL) or the human driver competence level (HDCL). If the on-board SDV control processor is deemed to be better than the human driver in controlling the SDV while the SDV experiences the current operational anomaly (i.e., the on-board SDV control processor has a relatively higher competence level than that of the human driver), then control of the SDV is assigned to the on-board SDV (block 514). That is, the SDV is placed in autonomous mode.

However, if the human driver is deemed to be better than the on-board SDV control processor in controlling the SDV while the SDV experiences the current operational anomaly (i.e., the human driver has a relatively higher competence level than that of the on-board SDV control processor), then control of the SDV is assigned to the human (i.e., the SDV is placed in manual mode), as described in block 516.

In one embodiment of the present invention, an alert is issued before (or instead of) the driving mode module 307 and/or the SDV on-board computer 301 and/or the coordinating server 201 assigns the SDV to be operated in autonomous or manual mode. That is, in one embodiment, the driving mode module 307 and/or the SDV on-board computer 301 and/or the coordinating server 201 issues an alert (e.g., a message or icon displayed on a display within the cabin of the SDV 202) advising the driver of the SDV 202 to manually engage the autonomous mode or to disengage the autonomous mode and take over manual control of the SDV 202. This alert may simply precede the driving mode module 307 and/or the SDV on-board computer 301 and/or the coordinating server 201 automatically changes from autonomous mode to manual mode (or vice versa), or it may be the only action taken by the driving mode module 307 and/or the SDV on-board computer 301 and/or the coordinating server 201, thus leaving the transition from autonomous mode to manual mode or vice versa up to the driver.

The flow-chart in FIG. 5 ends at terminator block 518.

In one embodiment of the present invention, the comparison of the control processor competence level to the human driver competence level is general (i.e., whichever competence level is higher, regardless of what roadway is being traveled on). However, in another embodiment of the present invention, the comparison of the control processor competence level to the human driver competence level is roadway specific. That is, the competence levels are based on how well the SDV control processor and/or the human driver control the SDV on the specific roadway (roadway 204) that the SDV is traveling on, and/or the current environmental conditions (traffic, weather, darkness, etc.) of that specific roadway.

As described herein, in one or more embodiments of the present invention wherein the current operational anomaly is from a group consisting of a presence of snow tires mounted on the SDV during a first road condition of the roadway (e.g., the SDV has snow tires but it is in the middle of summer, when snow tires provide less traction than when in snow in the winter), an absence of snow tires mounted on the SDV during a second road condition of the roadway (e.g., non-snow tires on the SDV in the middle of a blizzard), tire pressure in a tire mounted on the SDV being below or above a predetermined level (i.e., one or more tires are underinflated or overinflated), tire tread on a tire mounted on the SDV being less than a predefined limit (i.e., there is an insufficient amount of tread left on one or more tires), a level of windshield washer fluid in a windshield washer fluid reservoir mounted on the SDV being less than a predefined volume, an inoperable headlamp mounted on the SDV (i.e., a headlight is burned out), condensation frosting of windows on the SDV exceeding a predetermined limit, a failure of an antilock breaking system in the SDV, a failure of an all wheel traction system in the SDV, a low automatic transmission fluid level, a low windshield washer fluid level, a low fluid level in the radiator, and a faulty braking system in the SDV. These conditions may be detected by sensors (e.g., fluid sensors in the windshield washer fluid reservoir), cameras (e.g., an on-board camera aimed at the tires to detect the amount of tread and inflation in the tires), mechanical sensors (e.g., sensors that detect problems in the drivetrain or braking system), etc.

In one embodiment of the present invention, a sensor (e.g., one of sensors 153 shown in FIG. 1) used to describe current conditions of the roadway is mounted on the SDV. Sensor readings produced by the sensor describe environmental conditions of the SDV in real time. In this embodiment, one or more processors receive an environmental report from an environmental reporting service. The environmental report describes a general condition for the roadway. For example, a weather service ("environmental reporting service") may report via a data link (e.g., network 127 in FIG. 1) to processors on the SDV that there is icing occurring on the roadway 206 shown in FIG. 2.

One or more processors then compare environmental information from the environmental report to the sensor readings that describe the environmental conditions of the SDV in real time. In response to the environmental report disagreeing with the sensor readings, one or more processors disregard the sensor readings from the sensor and use the environmental report to describe the current condition of the roadway. That is, the processors will trust the weather report of ice on the roadway over what the sensors detect, since the sensors are only able to detect ice conditions (if at all) on the surface below the SDV at any point in time.

In one embodiment of the present invention, one or more processors retrieve driver profile information about the human driver of the SDV. The human driver of the SDV (e.g., SDV 202 shown in FIG. 2) is assigned to a cohort of drivers traveling on the roadway in multiple SDVs (e.g., SDV 210 and SDV 212 shown in FIG. 2). The current human driver of the SDV shares more than a predetermined quantity of traits with members of the cohort of drivers. The processor(s) retrieve traffic pattern data for the multiple SDVs occupied by the cohort of drivers traveling on the roadway, and then examine the traffic pattern data to determine a first traffic flow of the multiple SDVs occupied by members of the cohort of drivers. The SDVs in the first traffic flow are operating in the autonomous mode on the roadway.

The processor(s) also examine the traffic pattern data to determine a second traffic flow of the multiple SDVs occupied by members of the cohort of drivers. The multiple SDVs in the second traffic flow are operating in the manual mode on the roadway.

In response to determining that the first traffic flow has a lower accident rate than the second traffic flow, the processor(s) prohibit the SDV from operating in the manual mode.

For example, assume that a particular driver/occupant of an SDV has a characteristic (e.g., a history of traffic accidents while driving a vehicle in manual mode) found in other members of a cohort of drivers. Assume further that historical data shows that these cohort members have a history of accidents that is greater than that of on-board SDV control processors. Thus, if a particular driver matches up with the features found in members of this cohort, an assumption is made that this particular driver too is not as skilled as the on-board SDV control processor. As such, the control of the SDV is required to stay in autonomous mode, and is prohibited from switching to manual mode.

In one embodiment of the present invention, sensor readings are weighted and summed in order to determine whether or not an SDV should be required to operate in autonomous mode. Thus, one or more processors receive sensor readings from multiple sensors, where each of the multiple sensors detects a different type of anomalous operational condition of the vehicle. The processor(s) weight each of the sensor readings for different anomalous operational conditions of the vehicle, and then sum the weighted sensor readings for the anomalous operational conditions of the vehicle. The processor(s) determine whether the summed weighted sensor readings exceed a predefined level. In response to determining that the summed weighted sensor readings do exceed a predefined level, the on-board SDV control processor prohibits the SDV from operating in the manual mode. For example, assume that a first sensor detects faulty windshield wipers and the second sensor detects a faulty cabin air conditioning system. Assume further that historical data shows that many more accidents are caused by poor visibility (e.g., caused by faulty windshield wipers) than a warm cabin of the SDV. As such, the sensor readings from sensors that the faulty windshield wipers are weighted more heavily than sensor readings about cabin temperature. These weighted sensor readings are then added up. If the summed sensor reading weighted values exceed some predetermined value (which has been predetermined based on historic or engineering analyses as being a breakpoint over which the chance of accidents greatly increase), then control of the SDV must go into autonomous mode. However, if the summed sensor reading weighted values fall below this predetermined value, then control is pushed to (or left in) the manual mode.

In one or more embodiments of the present invention, the SDV 202 "learns" about how significant operational anomalies are. That is, by taking information from other SDVs and their driving history as well as the driving history of SDV 202 itself, SDV 202 is able to autonomous "learn" what operational anomalies are significant to the safe operation of SDV 202 (e.g., faulty brakes, faulty throttle controls, tires with little or no tread, etc.) and those which are comparatively insignificant (e.g., a cabin air conditioning system that is low on refrigerant, etc.).

In an embodiment of the present invention, if neither the autonomous mode nor the manual mode controls the SDV in a safe manner, then the SDV is autonomously pulled over to the side of the road and stopped. Thus, in this embodiment one or more processors set a minimum competence level threshold for the control processor competence level and the human driver competence level described above. The processor(s) then determines that neither the control processor competence level nor the human driver competence level meets or exceeds the minimum competence level threshold. In response to determining that neither the control processor competence level nor the human driver competence level exceeds the minimum competence level threshold, the driving mode module (e.g., driving mode module 307 in FIG. 3) directs the on-board SDV control processor to take control of the SDV and to bring the SDV to a stop.

In one embodiment, the decision by the driving mode module 307 in FIG. 3 to place the SDV in autonomous mode or manual mode is further dictated by how well a particular driver or a particular SDV control processor handles a specific geometry of the roadway 204 shown in FIG. 2 while a certain anomalous operational condition is being experienced by SDV 202. For example, assume that a particular driver manually maneuvers the SDV 202 around a cloverleaf exchange, in which the roadway loops around onto itself. If a driver does poorly in negotiating this cloverleaf exchange (e.g., hits the side of the cloverleaf barrier, is erratic in accelerating and/or braking through the cloverleaf, travels well above or well below the posted speed limit for the cloverleaf, etc.), as detected by various sensors 153 on the SDV 202, then the system will not let that driver negotiate through future and similarly configured (e.g., shaped) cloverleaves on the roadway, particularly if the SDV 202 is experiencing a problem (operational anomaly) with the antilock braking system (ABS). Rather, the system (e.g., driving mode module 307) will automatically engage the autonomous mode when the similarly configured cloverleaf comes up while the SDV 202 is experiencing this anomalous operational condition.

As described herein, in one embodiment of the present invention, the control processor competence level is based on a safety history for similar control processors in other SDVs. Thus, one or more processors retrieve control processor profile information about the SDV control processor that is on board the SDV. The processors(s) assign the SDV control processor that is on board the SDV to a cohort of SDV control processors in multiple other SDVs that are traveling on the roadway and experiencing a particular anomalous operational condition. This SDV control processor that is on board the SDV shares more than a predetermined quantity of traits with members of the cohort of SDV control processors. The processor(s) retrieve traffic pattern data for the multiple other SDVs that are traveling on the roadway, and then examine that traffic pattern data to determine a record of accidents for the multiple other SDVs traveling on the roadway while being controlled by the cohort of SDV control processors. The processor(s) then determine the control processor competence level (for the SDV control processor in SDV 202) based on the record of accidents for the multiple SDVs (e.g., SDV 210 and SDV 212) traveling on the roadway (e.g., roadway 204) while being controlled by the cohort of SDV control processors and the SDV 202 is experiencing the particular anomalous operational condition.

In one embodiment of the present invention, if environmental sensors on the roadway indicate that road conditions are too hazardous to allow the driver to manually control the vehicle while the vehicle is experiencing the anomalous operational condition, then manual mode is prohibited. That is, in one embodiment of the present invention, one or more processors receive sensor readings from multiple sensors (e.g., roadway sensor(s) 206 shown in FIG. 2). Each of the multiple sensors detects a different type of current condition of the roadway. The processor(s) weight each of the sensor readings for different current conditions of the roadway (e.g., one for temperature, one for darkness, one for precipitation, etc.), and then sum the weighted sensor readings for the different current conditions of the roadway. If summed weighted sensor readings exceed a predefined level, then the SDV control processor on the SDV prohibits the SDV from operating in the manual mode while the vehicle is experiencing the anomalous operational condition.

In one embodiment of the present invention, if the SDV control processor and the human driver are both incompetent to handle the operational anomaly (e.g., the SDV is on fire), then the SDV is automatically placed into autonomous mode and pulled over to the side of the road. That is, one or more processors set a minimum competence level threshold for the control processor competence level and the human driver competence level. If neither the control processor competence level nor the human driver competence level meets the minimum competence level threshold, then the driving mode module (e.g., driving mode module 307 in FIG. 3) directs the SDV control processor to take control of the SDV and to bring the SDV to an immediate stop.

In one embodiment of the present invention, if the roadway is too narrow, or is along a cliff, or otherwise is unduly hazardous, then this fact is considered when placing the SDV in autonomous or manual mode. Usually this will result in the SDV being placed into autonomous mode, but in some situations (e.g., where GPS or other positioning signals are spotty) it may be preferable/safer to let the driver manually control the vehicle. Thus, in one embodiment of the present invention the SDV on-board computer 301 and/or controlling server 201 receive, from one or more roadway sensors (e.g., roadway sensor(s) 206 in FIG. 2), a width of the roadway (e.g., roadway 204). Based on this information, one or more processors (e.g., within driving mode module 307 shown in FIG. 3) further selectively assign control of the SDV to the SDV control processor or to the human driver while the SDV experiences the current operational anomaly (and based on the width of the roadway).

In one embodiment of the present invention and as described above, the system will drive the SDV in autonomous mode to the nearest facility that can resolve the current operational anomaly. That is, control of the SDV is transferred to the SDV control processor, and then one or more processors (e.g., within SDV on-board computer 301) receive a location of a resource provider that has been predetermined to be capable of ameliorating the current operational anomaly in the SDV. The SDV control processor then maneuvers the SDV to the location of the resource provider.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
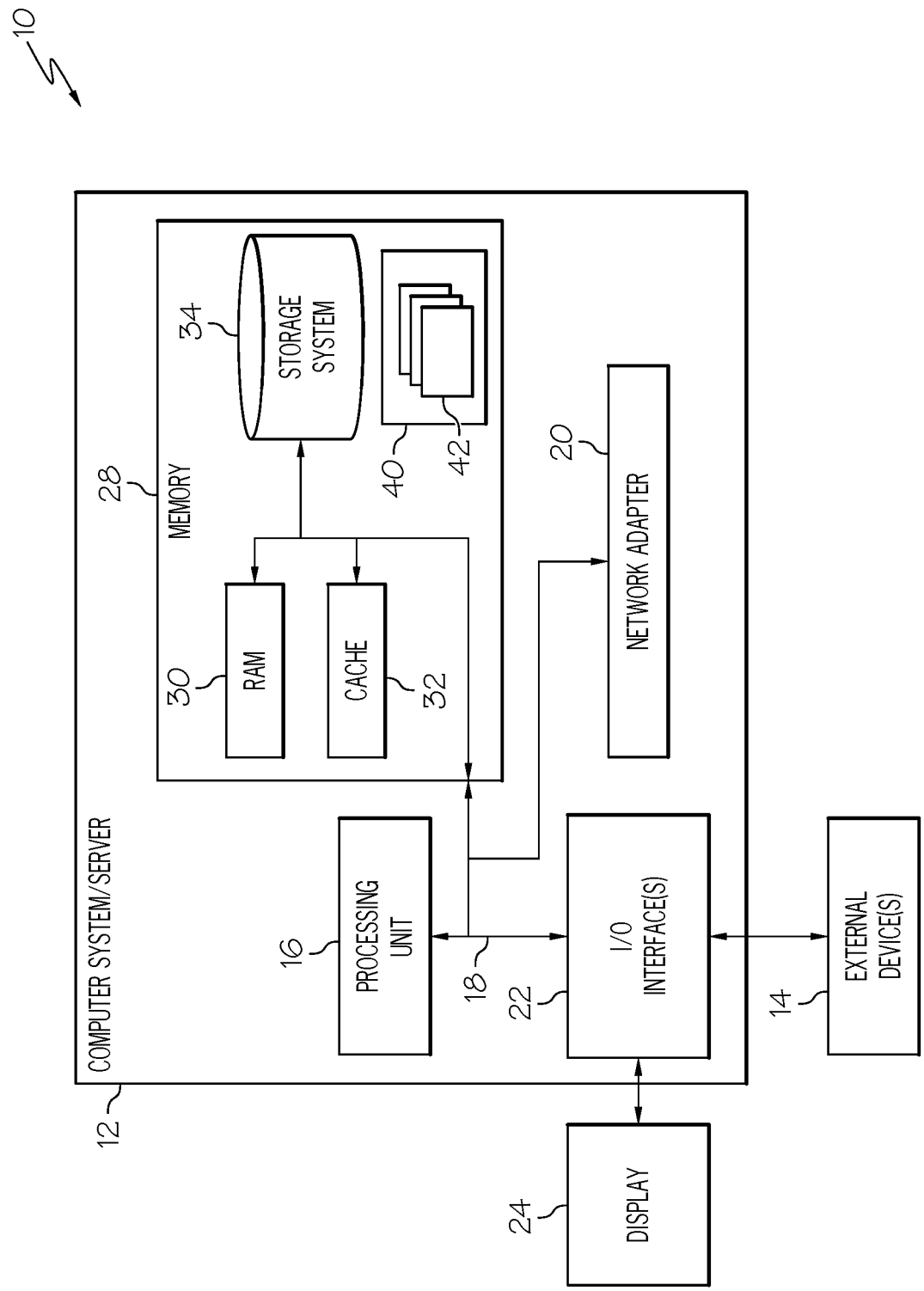
FIG. 6 depicts a cloud computing node according to an embodiment of the present disclosure.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
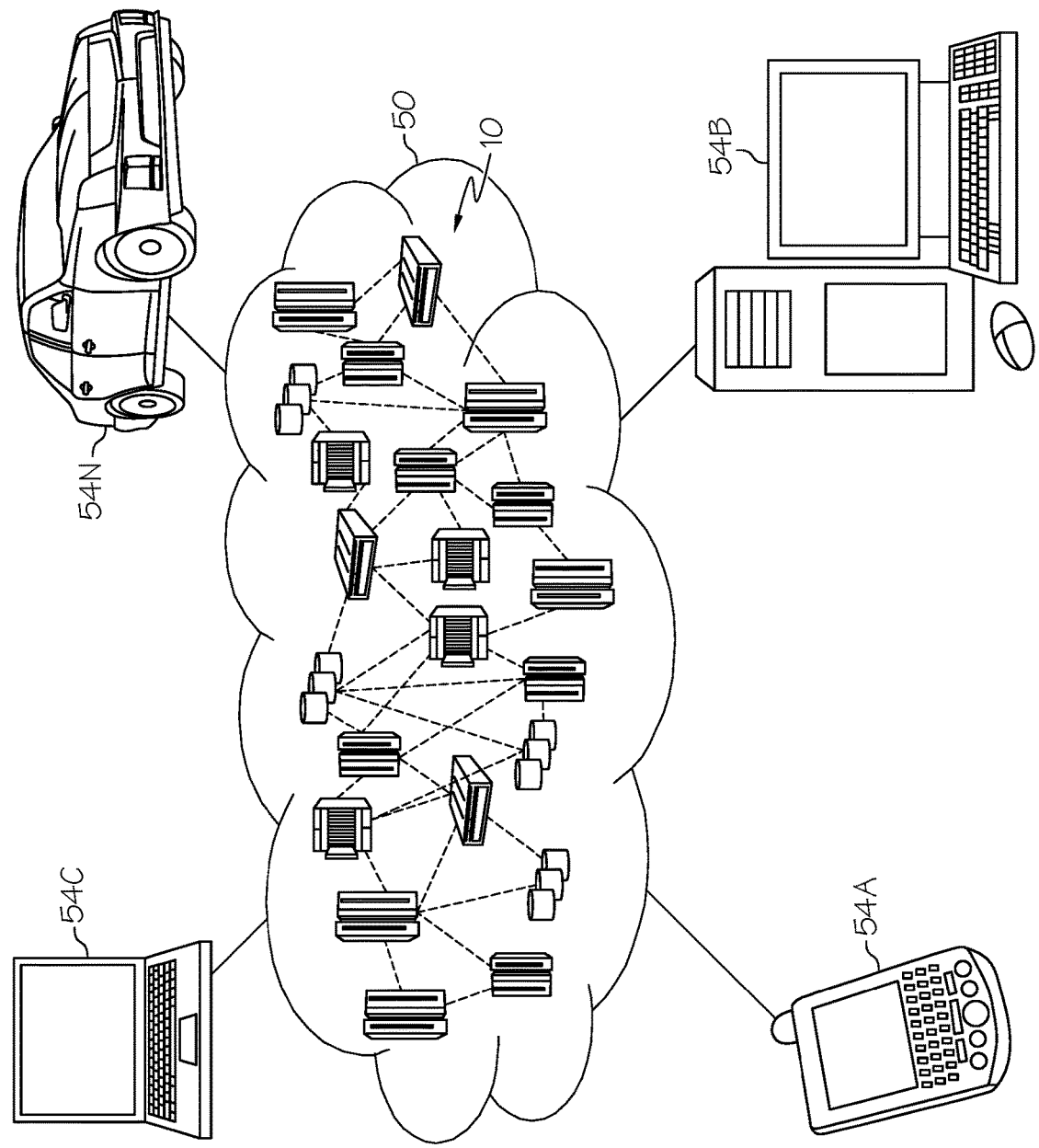
FIG. 7 depicts a cloud computing environment according to an embodiment of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
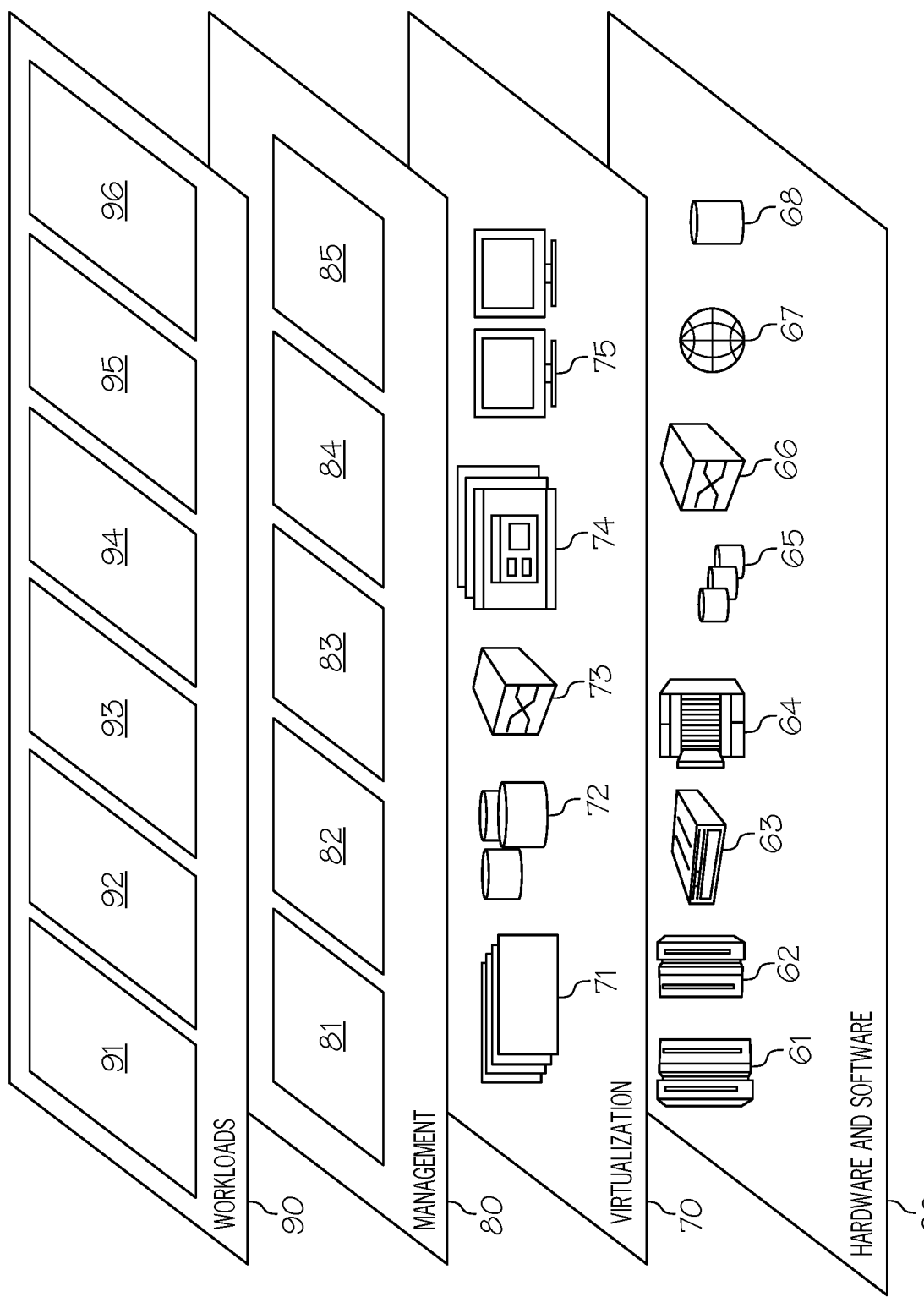
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-driving vehicle control processing 96 (for selectively setting control of an SDV to manual or autonomous mode as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A computer program product for controlling a driving mode of a self-driving vehicle (SDV), the computer program product comprising a non-transitory computer readable storage medium having program code embodied therewith, the program code readable and executable by a processor to perform a method comprising:
receiving as inputs from one or more sensors information forming an operational state of a self-driving vehicle (SDV), wherein the SDV is operable to provide autonomous control of driver controls comprising: engine throttle, steering mechanism, braking system, and navigation;
determining, by one or more processors, the operational state of the self-driving vehicle (SDV);
determining by one or more of said processors a vehicle fault;
determining a corrective action associated with said vehicle fault using a fault-remediation table;
the SDV implementing the corrective action; and
issuing an alert indicating the corrective action.

2. The computer program product of claim 1 wherein the corrective action is to reroute the SDV to a location to address the fault.

3. The computer program product of claim 1 wherein the corrective action is to transfer driver controls to manual control and the alert indicates take over immediately.

4. The computer program product of claim 3 wherein the corrective action is to disable autonomous control of steering.

5. The computer program product of claim 4 wherein the inputs from one or more sensors comprise GPS location information indicating the location of the SDV.

6. The computer program product of claim 4 wherein the inputs from one or more sensors comprise radar sensor readings from a radar sensor indicating the position of one or more physical objects around the SDV.

7. The computer program product of claim 3 wherein the corrective action is to disable autonomous control of speed.

8. The computer program product of claim 7 wherein the inputs from one or more sensors comprise radar sensor readings from a radar sensor indicating the position of one or more physical objects around the SDV.

9. The computer program product of claim 3, wherein the inputs from one or more sensors comprise radar sensor readings from a radar sensor indicating the position of one or more physical objects around the SDV and GPS location information indicating the location of the SDV.

10. The computer program product of claim 1 wherein the inputs from one or more sensors comprise internal sensors and roadway sensors.

11. The computer program product of claim 1 wherein the inputs from one or more sensors comprise GPS location information indicating the location of the SDV.

12. The computer program product of claim 1 wherein the inputs from one or more sensors comprise radar sensor readings from a radar sensor indicating the position of one or more physical objects around the SDV.

13. The computer program product of claim 1 wherein the corrective action is to stop the SDV.

14. The computer program product of claim 13 wherein the inputs from one or more sensors comprise radar sensor readings from a radar sensor indicating the position of one or more physical objects around the SDV.

15. The computer program product of claim 1 wherein the determining a corrective action utilizes weighted voting.

16. The computer program product of claim 1 further comprising receiving, by the one or more processors, active learning data, said active learning data including information from other SDVs.

17. The computer program product of claim 1 wherein the vehicle fault comprises a mechanical fault in one or more vehicle systems.

18. The computer program product of claim 1 wherein the vehicle fault comprises a current weather condition of the roadway on which the SDV is currently traveling.

19. A computer program product for controlling a driving mode of a self-driving vehicle (SDV), the computer program product comprising a non-transitory computer readable storage medium having program code embodied therewith, the program code readable and executable by a processor to perform a method comprising:
determining a control processor competence level of a self-driving vehicle (SDV) control processor, wherein the control processor competence level describes a competence level of the SDV control processor in controlling the SDV while the SDV encounters a current roadway condition of a roadway on which the SDV is currently traveling, wherein the current roadway condition comprises a current weather condition of the roadway on which the SDV is currently traveling;
receiving as inputs from one or more sensors information about the control processor competence level of the self-driving vehicle (SDV) control processor, wherein the SDV is operable to provide autonomous control of driver controls comprising: engine throttle, steering mechanism, braking system, and navigation;
determining a corrective action; and
the SDV implementing the corrective action; and
issuing an alert indicating the corrective action.

20. The computer program product of claim 19 wherein the corrective action is to transfer one or more driver controls to manual control and the alert indicates take over.

21. The computer program product of claim 20 wherein the corrective action is to disable autonomous control of steering.

22. The computer program product of claim 21 wherein the inputs from one or more sensors comprise GPS location information indicating the location of the SDV.

23. The computer program product of claim 21 wherein the inputs from one or more sensors comprise radar sensor readings from a radar sensor indicating the position of one or more physical objects around the SDV.

24. The computer program product of claim 21 wherein the inputs from one or more sensors comprise GPS location information indicating the location of the SDV.

25. The computer program product of claim 24 wherein the inputs from one or more sensors comprise radar sensor readings from a radar sensor indicating the position of one or more physical objects around the SDV.

26. The computer program product of claim 20 wherein the corrective action is to disable autonomous control of speed.

27. The computer program product of claim 19, wherein the method further comprises:
retrieving control processor profile information about the SDV control processor that is on board the SDV;
assigning the SDV control processor that is on board the SDV to a cohort of SDV control processors in one or more other SDVs that are traveling on one or more roadways, wherein the SDV control processor that is on board the SDV shares more than a predetermined quantity of traits with members of the cohort of SDV control processors;
retrieving traffic data for the one or more other SDVs;
examining the traffic data to determine a record of events for the one or more other SDVs controlled by the cohort of SDV control processors; and
determining the control processor competence level based on the record of events for the one or more other SDVs controlled by the cohort of SDV control processors.

28. The computer program product of claim 19, wherein the method further comprises:
receiving sensor readings from multiple sensors, wherein each of the multiple sensors detects a different type of current operational anomaly in the SDV;
weighting each of the sensor readings for different current operational anomalies in the SDV;
summing weighted sensor readings for the different current operational anomalies in the SDV;
determining whether the summed weighted sensor readings exceed a predefined level; and
in response to determining that the summed weighted sensor readings exceed a predefined level, prohibiting the SDV from operating in a SDV mode.

29. The computer program product of claim 19, wherein the program code is provided in a cloud environment.

30. A computer system comprising:
a processor, a computer readable memory, and a non-transitory computer readable storage medium;
first program instructions to determine a control processor competence level of a self-driving vehicle (SDV) control processor, wherein the control processor competence level describes a competence level of the SDV control processor in controlling a SDV while the SDV encounters a current roadway condition of a roadway on which the SDV is currently traveling, wherein the current roadway condition comprises a current weather condition of the roadway on which the SDV is currently traveling;
second program instructions to determine if the control processor competence level of the SDV is below a minimum competence level; and
third program instructions to selectively assign control of the SDV to a human driver while the SDV encounters the current roadway condition based on whether the control processor competence level is lower than minimum competence level; and wherein the first, second, and third program instructions are stored on the non-transitory computer readable storage medium for execution by one or more processors via the computer readable memory.

\* \* \* \* \*